J. E. C. DE WIJS.
APPARATUS FOR DIRECTING CIRCULAR SAWS WHEN GRINDING ON ROTARY STONES.
APPLICATION FILED MAY 18, 1922.

1,436,485.

Patented Nov. 21, 1922.

Inventor:
Jean Esaie Christierne de Wijs

By
Langner, Parry, Card & Langner
Attys

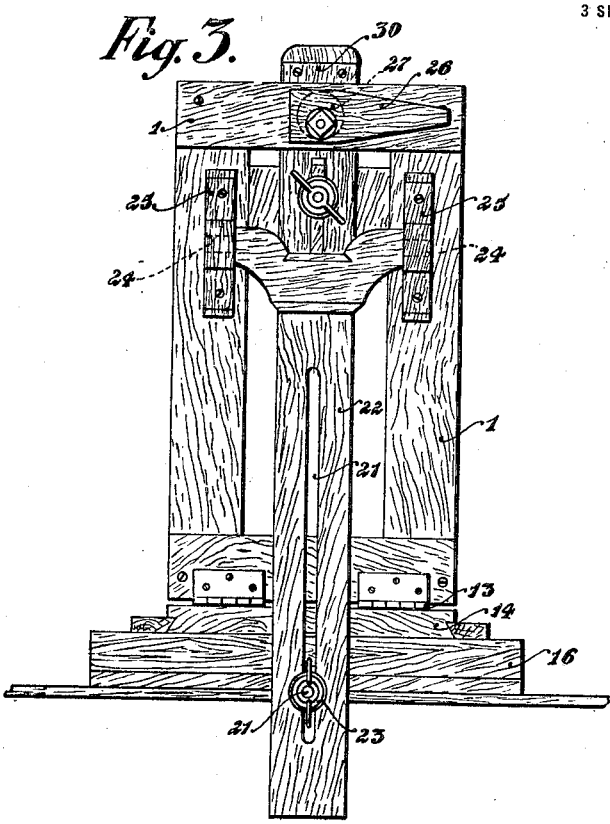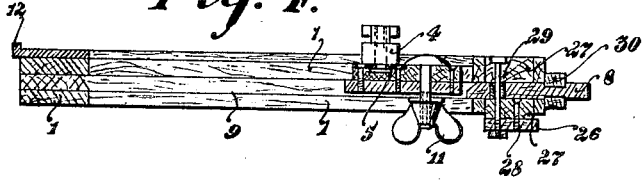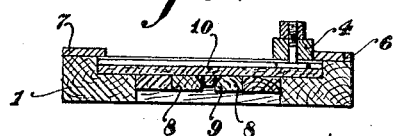

J. E. C. DE WIJS.
APPARATUS FOR DIRECTING CIRCULAR SAWS WHEN GRINDING ON ROTARY STONES.
APPLICATION FILED MAY 18, 1922.
1,436,485.
Patented Nov. 21, 1922.
3 SHEETS—SHEET 3.
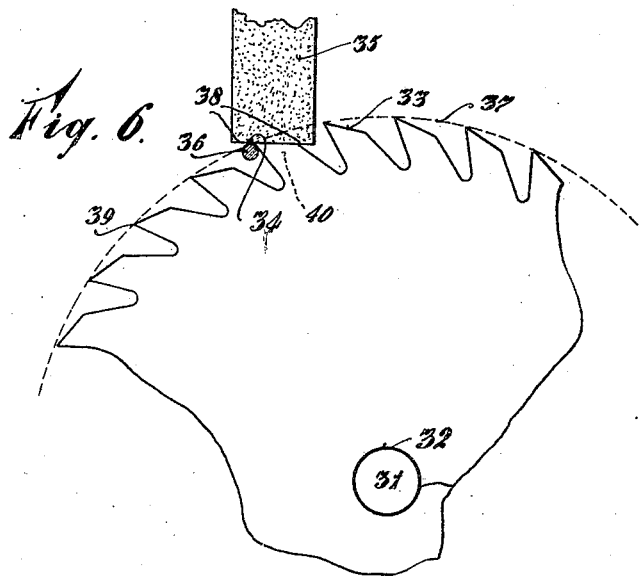
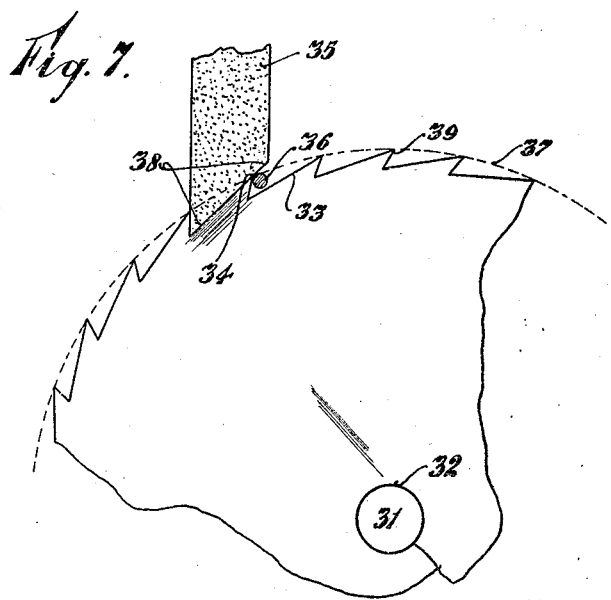
Inventor:
Jean Esaie Christierne de Wijs Patented Nov. 21, 1922.

1,436,485

UNITED STATES PATENT OFFICE.

JEAN ESAIE CHRISTIERNE DE WIJS, OF LEIDEN, NETHERLANDS.

APPARATUS FOR DIRECTING CIRCULAR SAWS WHEN GRINDING ON ROTARY STONES.

Application filed May 18, 1922. Serial No. 561,958.

*To all whom it may concern:*

Be it known that I, JEAN ESAIE CHRISTIERNE DE WIJS, residing at Leiden, Oude Rijn 68ª, the Netherlands, have invented certain new and useful Improvements in Apparatus for Directing Circular Saws When Grinding on Rotary Stones, of which the following is a specification.

The invention relates to an apparatus for directing circular saws when grinding on rotary stones and has for its object to construct this apparatus in such a manner that the grinding is effected most accurately and a universal adjustability of the apparatus is obtained.

According to the invention the adjusting frame for the circular saw is provided at the front end with a stop for the saw tooth to be ground, whereas the boss for the saw shaft hole is adjustable in transverse and longitudinal direction on an adjusting plate, which is shiftable with respect to the frame, while the extreme positions of the boss are determined by symmetrically arranged ledges or stops on the frame in correspondence with the grinding angle desired.

Preferably the adjusting plate is adjustably connected to a member, adapted to be shifted to and fro with respect to the frame, in such a manner, that the path of the saw teeth can be brought behind the stop and that when sliding back the said member the adjusting plate is returned in the original position.

An apparatus according to the invention has the advantage that all the teeth perform their function and not only a portion of them. As a consequence by using an apparatus according to the invention the effect is obtained that a circular saw, which ground in the old manner would require under certain circumstances 5 H. P. for being driven, can now be driven under the same circumstances by 2 H. P.

The invention will be more fully understood with reference to the accompanying drawings in which—

Fig. 3 is a rear elevation of the apparatus.

Fig. 4 is a section according to the line A—B in Fig. 2.

Fig. 5 is a section according to the line C—D in Fig. 2.

Fig. 6 shows a portion of a circular saw with parrot-mouth-teeth and a flat grinding-stone.

Fig. 7 shows a portion of a circular-saw having triangular teeth and an obliquely profiled grinding stone.

Figure 1:
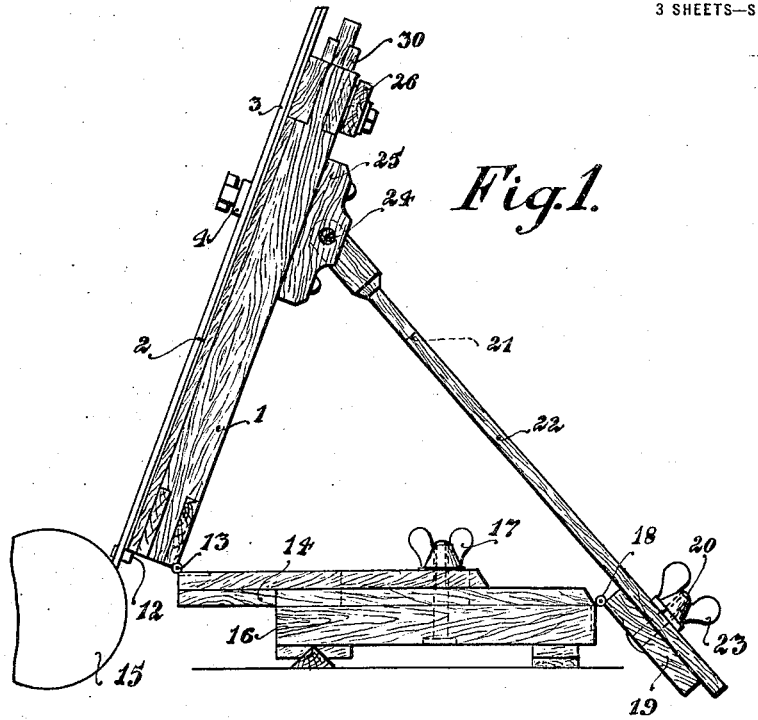
Fig. 1 is a side elevation of an apparatus according to the invention with a grinding stone.

The apparatus shown consists mainly of an adjusting frame, upon which the circular saw rests, and of a foot piece with a slide, the front end of which is articulated to the lower end of the adjusting frame, while the rear end of the foot piece is articulated to the adjusting frame in proximity to the upper end of the latter by means of an adjustable rod. The adjusting frame 1 carries a base plate 2, e. g., a cardboard-disc, the diameter of which is a few inches smaller than that of the saw and of sufficient thickness for compensating the setting of the teeth. The circular saw 3 rests on the plate 2, the hole for the saw shaft surrounding the boss 4. This boss is passed over a pin and is secured to the adjusting plate by means of a butterfly-nut, whereby the boss lies against one of the ledges 6 and 7, secured on the adjusting frame. When using circular saws having different shaft holes then for each dimension a boss of corresponding diameter may be used, which boss may be placed on the same pin; a cylindrical ring or sleeve could also be placed around the boss and if necessary overlap the ledge. For a smaller shaft hole a boss is used, the end of which projecting above the ledge only having the same diameter as the shaft hole. An eventual slight difference in the grinding angle is practically of no importance. However, the slightest difference can be avoided by the above mentioned adjustment. It appears from the above that the grinding angle can be adjusted by altering the diameter of the lower end of the boss (so far as the boss remains under the upperside of the ledges) or by arranging a ring around the lower end of the boss.

Figure 2:
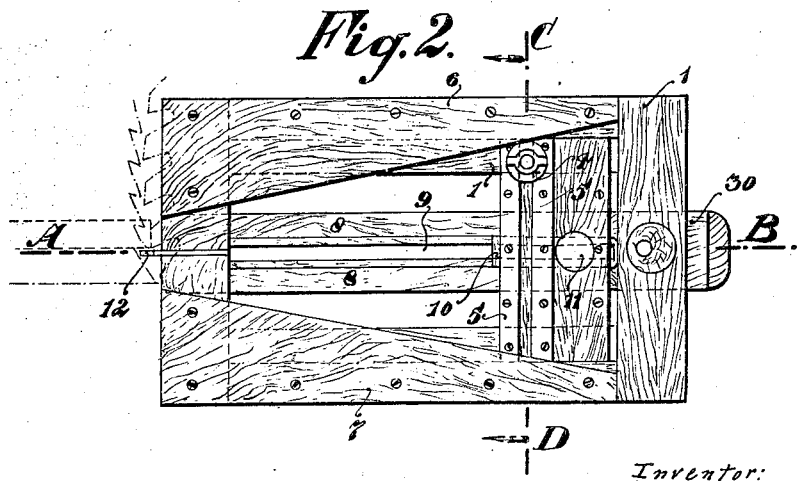
Fig. 2 is a plan view of the adjusting frame, the circular saw of Fig. 1 being only indicated by a portion of its parrot-mouth-teeth, while a number of ordinary triangular teeth of another circular saw are also illustrated.

As appears from Figs. 2 and 4 the boss 4 is slidable transversely of the adjusting frame by means of a guide 5, the extreme positions of the boss and thereby the grinding angle of the teeth being determined by the ledges 6 and 7. With a view to the inclined direction of the inner side of the said ledges the grinding angle remains always the same for saws of various dimensions owing to the fact, that the angles formed by the ledges at both sides are equal, however, in opposite directions.

For grinding circular saws of different diameter means are arranged for permitting a sliding movement in longitudinal direction. To this end the portion 8 and the adjusting plate for the saw are connected to each other by means of a slot 9 in the portion 8 and a ridge 10 of the adjusting plate, the ridge being slidable in the slot. The adjusting plate with the circular saw can be fixed in the adjusted position in the slot 9 by means of a butterfly-nut 11. At the front the frame is provided with a stop or projection 12 against which a saw tooth to be ground comes to lie and by means of which the correct position of the teeth to be ground is always secured.

This projection is adjustable. It is clamped between two wedge-shaped plates, the outer edges of which are abutting against the ledges 6 and 7. It appears from Fig. 2 that the stop 12 is to be pushed out farther when grinding saws having triangular teeth than when grinding parrot-mouth-shaped teeth.

It appears from Figs. 1 and 3 that the adjusting frame is articulated at 13 to a slide 14 adapted to be moved to and away from the grinding stone 15 on a foot 16 mounted on rails or in another suitable way, so that the whole apparatus may be moved laterally. The position of this slide with respect to the foot can be fixed by means of a butterfly-nut 17. Articulated at 18 to the rear end (Fig. 1) of the foot 16 is an arm 19, having a hole for a screw-bolt 20, projecting through a longitudinal slot 21 of a rod 22 and adapted to be fixed by a butterfly-nut 23. In this way the position of the rod is determined. The rod 22 is articulated at 24, 24 to a pair of blocks 25 secured to the underside of the adjusting frame (Fig. 3).

For bringing the path of the teeth of the circular saw behind the stop 12, in order to replace a ground tooth by the following tooth to be ground, use is made of an arm 26, attached to two eccentric discs 27 by a screw 28 and a screw bolt 29. The eccentric discs are rotatable in holes of the adjusting frame, while a small disc, clamped between the discs 27 and surrounding the bolt 29, is rotatable in the portion 8 of the frame and adapted to shift the latter upwardly owing to the fact that the portion 8 is slidable in the adjusting frame. Seeing that the adjusting plate is clamped to the portion 8, a longitudinal displacement of the adjusting plate with the circular saw can be obtained by turning the arm 26, the path of the teeth being then brought behind the stop 12, whereupon the saw is rotated the required angle and shifted back with the following tooth to be ground when turning the arm 26 in opposite direction.

The saw is always returned in the original position of the adjusting plate by reason of the fact that a stop 30 attached to the portion 8 is arrested by the adjusting frame.

The operation of the apparatus is mainly as follows:

The boss 4 is adjusted in accordance with the diameter of the circular saw to be ground and the adjusting plate is fixed in the slot 9 by means of the butterfly-nut 11. The circular saw with its base-plate is placed upon the frame with the shaft-hole around the boss 4, whereafter the desired position with respect to the grinding-stone is obtained by means of the slide 14 and the adjustable articulation of this slide and of the foot 16 to the adjusting frame. Half the number of teeth of the saw (every other tooth) is ground when the boss 4 is lying against the one ledge, whereupon the saw is reversed and the boss 4 is shifted against the other ledge, whereafter the other teeth are ground. The fixed position of the stop 12 with respect to the boss 4, at the moment that the saw-tooth is ground, secures entirely the same position of all the teeth with respect to the centre of the saw. The grinding is for the rest effected in the usual way which needs no further explanation.

It will be clear that the utmost accurateness and universal adjustability are obtained by the apparatus according to the invention.

Finally reference is directed to Figs. 6 and 7 of the drawings elucidating the use of the stop for the saw-tooth to be ground.

In these figures 31 is the centre of the saw, 32 is the boss for the shaft-hole of the saw, 33 the back of the saw-tooth, 34 the cutting-point of the saw-tooth, 35 the grinding-stone, 36 the projection or stop, 37 the cutting-line, 38 the grinding-line.

It appears clearly from these figures, that when the stop for the saw-teeth would be placed at 39 and the distance between two saw-teeth would be larger than that between the preceding-teeth, the cutting-point of the tooth to be ground would fall, e. g., at 40 in the grinding-line, that is to say inside the cutting-line 37 of the other saw-teeth.

In the case of a smaller distance between two saw-teeth the cutting-point of the saw-tooth to be ground would fall outside the cutting-line 37 or the saw-tooth would eventually remain blunt.

Finally it is remarked that it does not matter whether the stop is placed at the point of a tooth, or, e. g., in the middle of the breast of a tooth. The inclination of the breasts of all the teeth is practically always the same and can easily be maintained the same.

Having now fully described and ascertained the nature of my said invention, what I claim as new and desire to secure by Letters Patent is:

1. Apparatus for directing circular saws when grinding on rotary stones comprising an adjusting frame for the circular saw, a stop at the front end of the said frame for the tooth to be ground, a boss for the shaft hole of the saw, the boss being slidable in transverse and longitudinal direction on an adjusting plate slidably mounted with regard to the frame and ledges symmetrically arranged on the frame and determining the extreme positions of the boss in accordance with the desired grinding angle.

2. Apparatus according to claim 1, characterized in that the adjusting plate is adjustably mounted on a member adapted to be shifted to and fro with respect to the frame in such a manner, that the path of the saw teeth can be brought behind the stop and that, when moving back the said member, the adjusting plate is returned to its original position.

3. Apparatus according to claim 2, including an eccentric disc and a lever by a rotation of which a displacement of the adjusting plate with respect to the adjusting frame is obtained, so that the path of the saw teeth can be brought behind the stop.

In testimony whereof I affix my signature.

JEAN ESAIE CHRISTIERNE de WIJS.